Aug. 11, 1931.   J. JOUY   1,818,066
SYSTEM FOR RECOVERING THE ENERGY OF THE MOVEMENTS OF THE SEA
Filed July 6, 1929   5 Sheets-Sheet 2

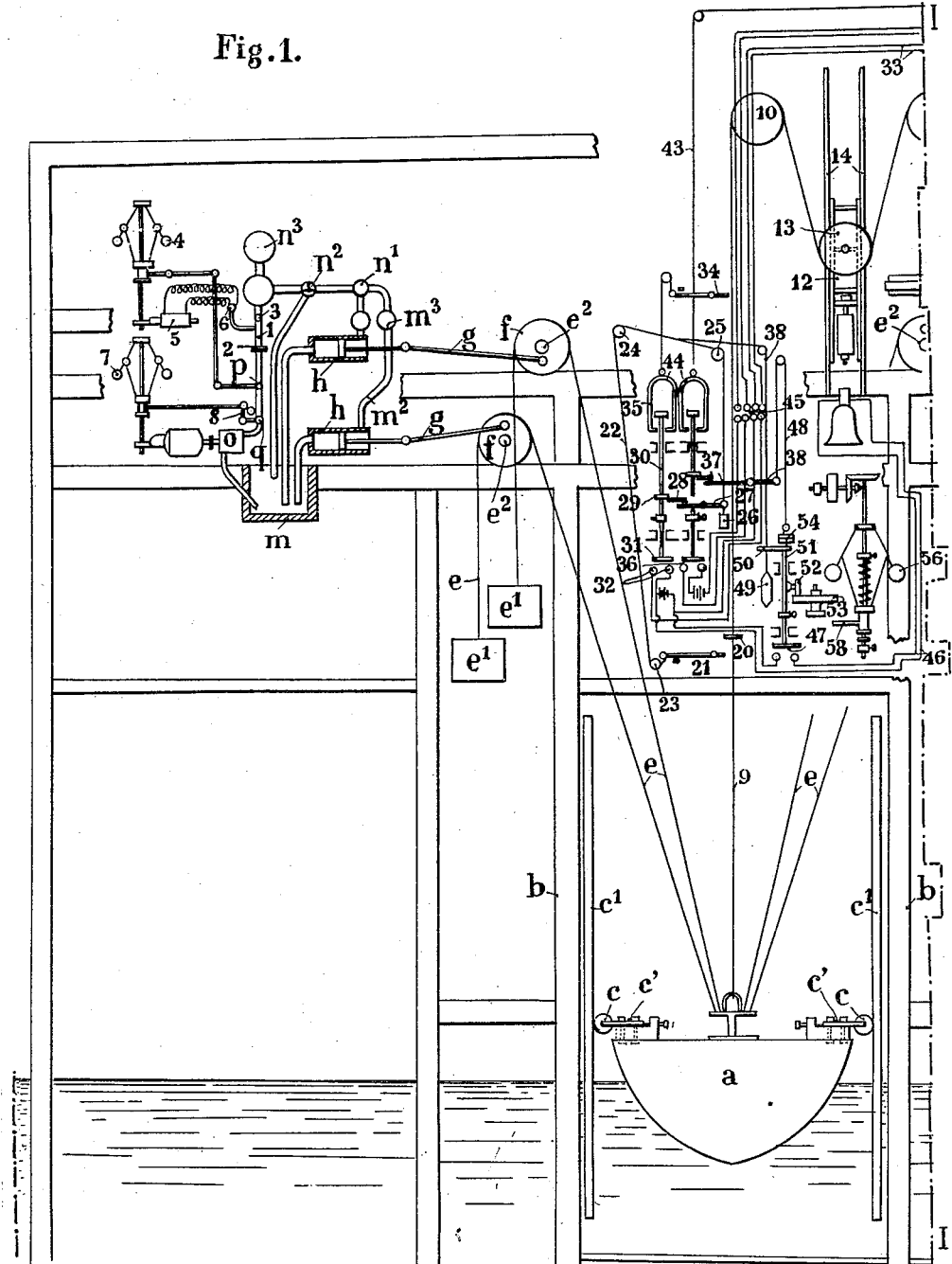

INVENTOR
Jules Jouy
by
ATTORNEY

Aug. 11, 1931.   J. JOUY   1,818,066
SYSTEM FOR RECOVERING THE ENERGY OF THE MOVEMENTS OF THE SEA
Filed July 6, 1929   5 Sheets-Sheet 4

INVENTOR
Jules Jouy
by ATTORNEY

Patented Aug. 11, 1931

1,818,066

UNITED STATES PATENT OFFICE

JULES JOUY, OF EPERNAY, FRANCE

SYSTEM FOR RECOVERING THE ENERGY OF THE MOVEMENTS OF THE SEA

Application filed July 6, 1929, Serial No. 376,343, and in France June 4, 1929.

Various systems have already been proposed in which it has been attempted, by various means, to recover the energy of the movements of the sea. But none of these systems has been capable of receiving a practical application. Those which have been tried on half-sheltered waters have given but insufficient results, whilst those which have been exposed to the direct action of the sea have not been able to resist the destructive action of strong waves.

The present invention has for its object a new system essentially combined in such a manner as to ensure an automatic and safe operation, and capable, consequently, of resisting the action of strong waves and even a race of the tide.

The system is based on the same principle as the previous patent filed May 21, 1927, under Serial No. 193,210, in the name of the applicant, that is to say it comprises one or more floats, partially balanced by counterweights, which act through racks or through cables, on speed gears, preferably provided with change speed gears. These speed gears actuate pumps which deliver water in pipe lines or tanks under pressure, for instance under air pressure. This water is then led to turbines actuating electric motors.

In accordance with the present invention, the plant is protected by a special system. This system is constituted by wave-breaking panels, of the slotted shutter type, vertically movable in slides secured on external pillars in contact with the sea through steel barriers provided with inclined vanes leaving a gap betweend each vane. These barriers are called hereinafter "eddy-dams"; they are adapted to regulate the action of the waves on the floats and resist to the enormous power of the devastating waves by transforming them into an eddy which is more accentuated as the waves are higher and have greater speed. The eddy partly retained within the dams will not ebb out as quickly as the wave which has produced it and will attenuate the action of the following wave.

These eddy-dams can be vertically moved by means of winches through hydraulic pressure or through electric motors. They also shelter the floats against the strongest waves by means of automatic devices, the description of which will be given later on.

When the sea suddenly ebbs out in case of a race of the tide, or when the speed of the waves becomes too great, these automatic devices close the circuit of the electric motors actuating the winches and cause said eddy-dams to move down, so that in case of danger, the plant is automatically protected.

On the other hand, if the float suddenly descends, this movement establishes other contacts and sets in motion other motors capable of immediately producing the raising of the float and to shelter it from excessively violent waves due to the return of the sea in case of race of the tide.

Moreover, bells are actuated in case of need for warning the attendant who sets the plant working again only when he considers it possible, and in the conditions suited to the state of the sea.

The invention is illustrated, by way of example only, in the accompanying drawings in which.

Figure 1:
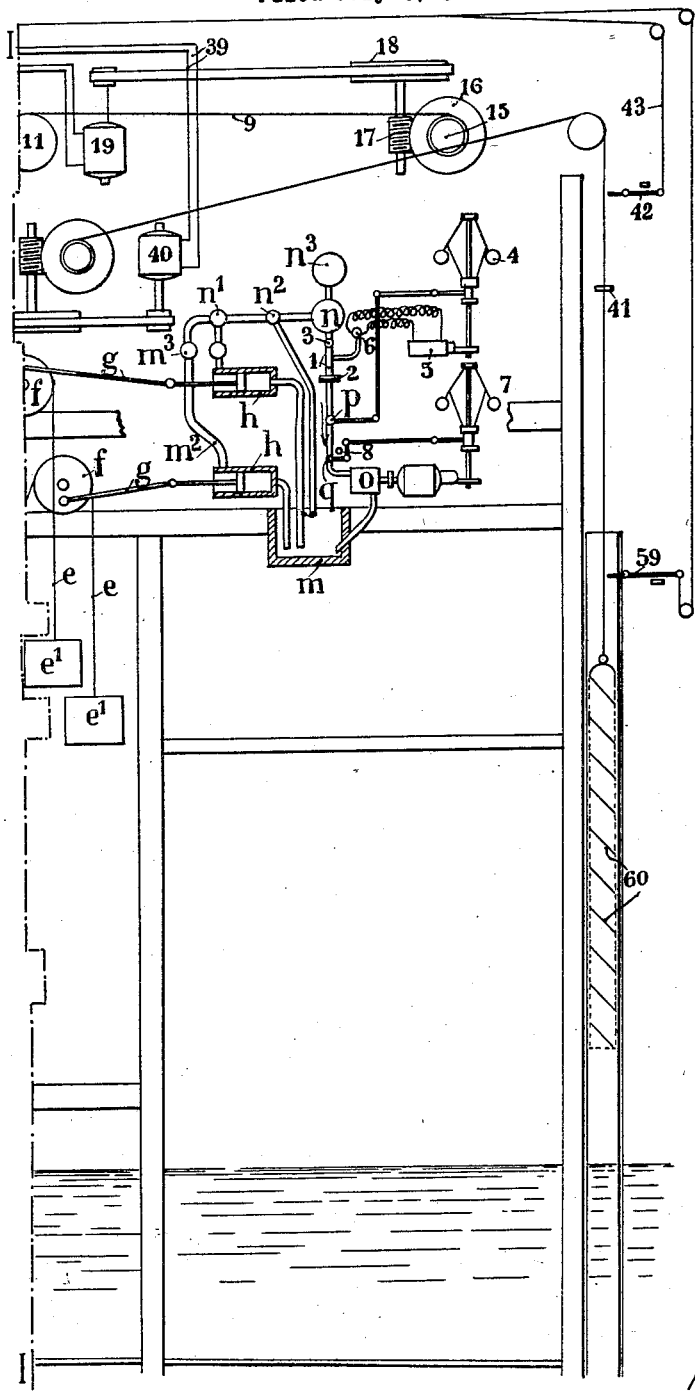
Fig. 1 is a diagrammatic elevation of the entire plant.
Figure 2:
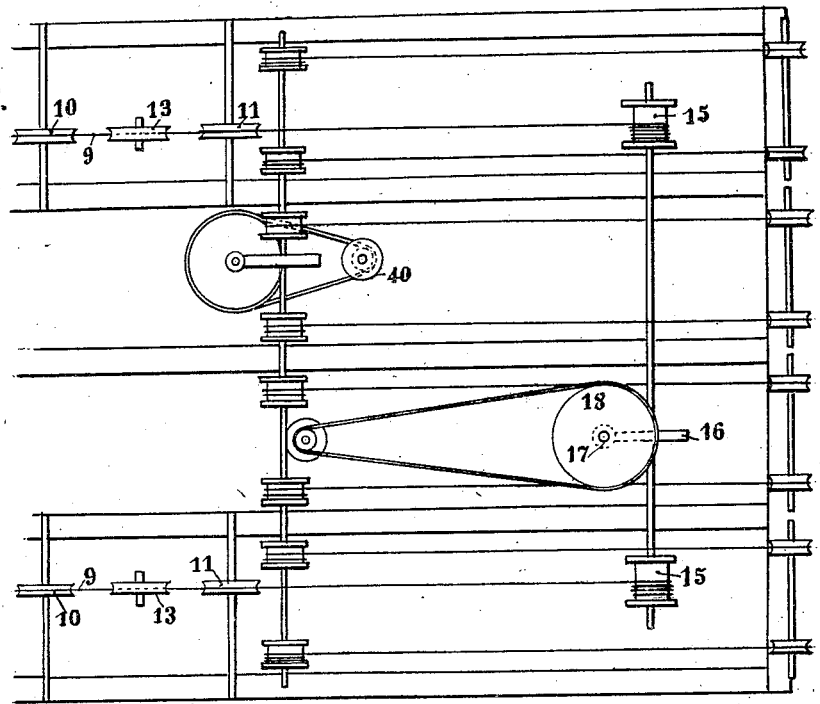
Fig. 2 is a partial plan view of said plant.
Figure 3:
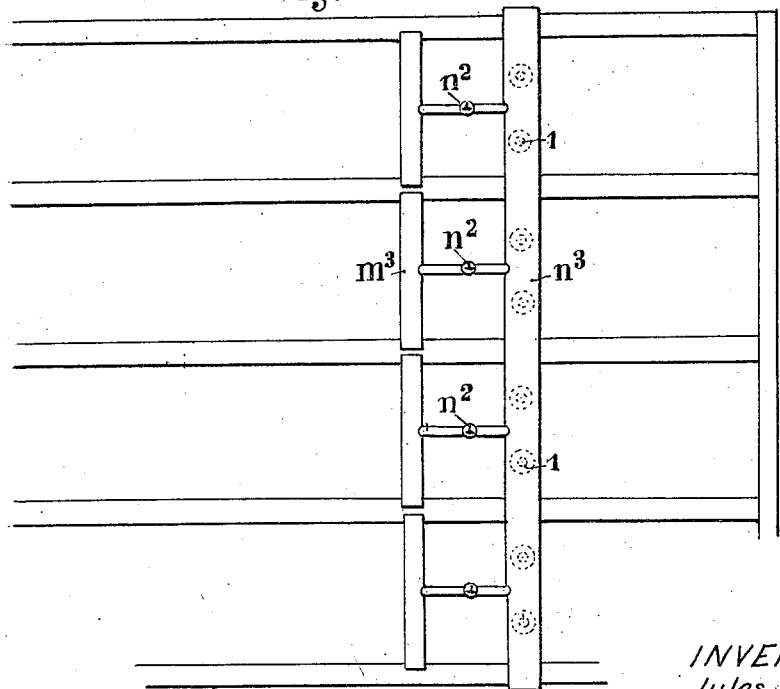
Fig. 3 is a detail view in plan of the delivery piping of a group of pumps.
Figure 4:
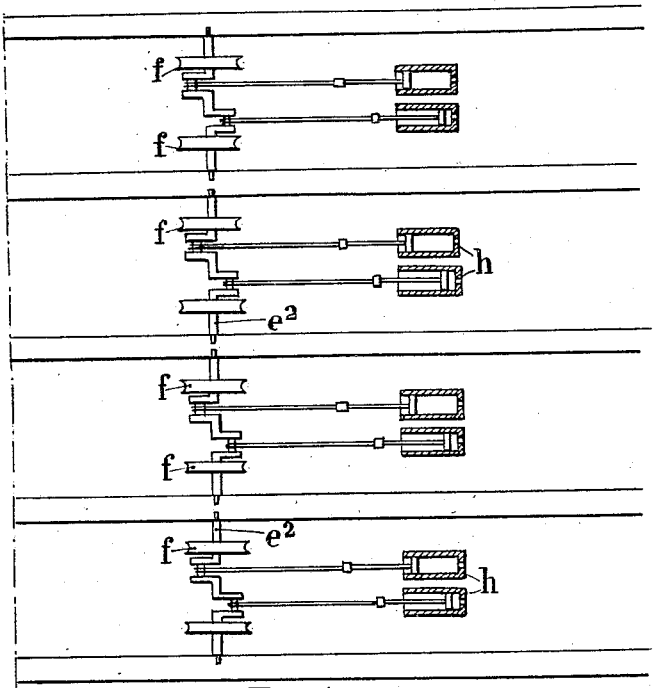
Fig. 4 shows in plan and partially in section a group of four pairs of upper pumps.
Figure 5:
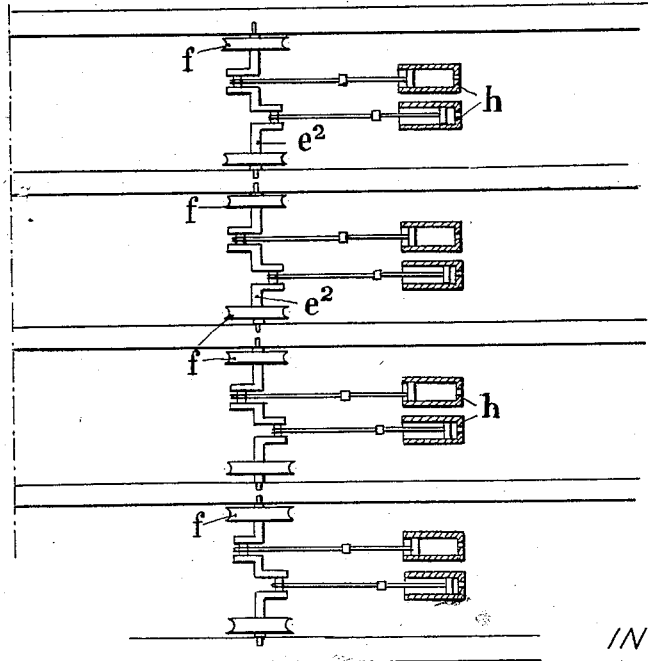
Fig. 5 is a view similar to Fig. 4 showing a group of four pairs of lower pumps.
Figure 6:
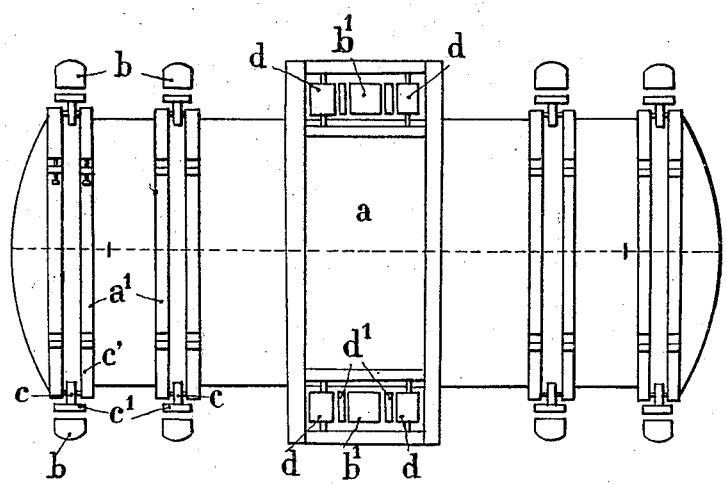
Fig. 6 is a plan view of the float.

As illustrated in the drawings, the apparatus comprises a float $a$ of large dimensions, which can be constituted for instance by a barge made of steel or reinforced concrete.

The dimensions and tonnage of this barge serve as a basis for designing the plant and the construction of the structure containing it.

Pillars $b$ are adapted to guide the float; they present, for that purpose, a vertical bearing surface parallel to the longitudinal axis of the float, opposite which surface can move rollers $c$, mounted in adjustable fork pieces $c'$, rendered rigid, for instance by means of girders or beams $a^1$, with the float $a$, this device ensuring a guiding action against any transverse displacement.

Other pillars $b^1$, arranged near the center, are each provided with a vertical bearing surface at right angles to the longitudinal axis of the float, opposite which surface move rollers $d$ mounted in adjustable fork pieces, or any other suitable frame rigid with the float. This second device guides the float and prevents any longitudinal displacement of the same. The upward movements of variable or different amplitude from one end of the float to the other, will not have any influence on the operation.

The assembly of these devices constitutes a rigid armature which is particularly resistant.

Between the rollers $c$ and $d$ and the vertical bearing surfaces are interposed intermediate resilient cushions $c^1$, $d^1$, covered with a structure made of planks on which the rollers are adjusted for leaving a clearance of a few millimeters.

The float or floats are partially balanced by counterweights $e^1$, each connected to the float by two cables $e$, passing over two grooved pulleys $f$ rigidly secured on shafts $e^2$. These shafts $e^2$ actuate, through connecting rods $g$, pumps $h$, in both directions of rotation according to the vertical movements of the float. These pumps suck water, mixed with soluble oil, which circulates in up channels $m$, made of reinforced concrete, extending on either side throughout the length of the installation, and deliver this water, through conduits $m^2$, provided with check valves arranged at $m^3$, into pipe lines $n^1$; a pipe line $n^1$ is provided for each group of 4 pumps. The pipe lines $n^1$ are connected, through a conduit provided with a two-way cock $n^2$, to a large pressure pipe line $n$ connected to a similar conduit arranged on the other side. These conduits are connected to compressed air tanks $n^3$, for the purpose of providing the necessary resiliency, by taking into account that water is not compressible.

To the pressure pipe lines $n$ are connected, at each span, two conduits $l$, having a union 2 and provided with a shut-off cock 3, feeding turbines $o$; pressure regulating valves all open in the up and suction channels $m$ so as to bring back the water in these latter.

On each conduit $l$ extending from the pressure pipe line $n$ are arranged two sluice valves $p$ and $q$ controlling the feeding of the turbines.

The valve $p$ is operated by a set of levers of a ball governor 4; the latter is actuated by a small electric motor 5 when the index of the pressure gauge 6 comes in engagement with a contact, at the predetermined pressure, and thus closes the circuit of this motor. It will therefore be understood that when the pressure reaches a predetermined value, the pressure gauge closes the circuit of the small electric motor 5, thus actuating the governor 4 and fully opening the valve $p$; the turbine immediately starts; its regular speed is ensured by the operation of the valve $q$, also actuated by a ball governor 7 directly driven by the shaft of the electric motor which is coupled thereto; it controls the opening of the valve $q$ according to the desired speed. An abutment 8 limits its movement so that it closes only to three quarters of its fully closed position for facilitating re-starting.

The float is made of reinforced concrete; the shell is partitioned and reinforced for constituting a driving apparatus. By way of example, it can be indicated that the dimensions are of ten meters in length, and four meters in width, that is to say 40 square meters; its weight being completed to 80 tons and lightened of 38 tons by counterweights, there remains therefore an available energy of 36 tons.

The tonnage of the float of 80 tons lightened of 38 tons, will have as sinking down movement, at each dead center 42 tons; in its series of raising movements, its lightening of 38 tons will be diminished by the resistance of 36 tons of available energy, and there remains for the sinking down movement 78 tons.

In the series of lowering movements, its tonnage is diminished of 38 tons in counterweights to be raised, plus the resistance of the 36 tons of energy, there remains 6 tons for the sinking down movement. The weight of the float is always greater.

The 36 tons of force on the wheels having a diameter of one meter give an energy of 96 horse power on the axes of the connecting rods arranged at 25 centimeters from the axis of rotation, for actuating the 32 pumps; assuming that the speed of the float is of ten centimeters per second, and that of the connecting rods of five centimeters, one obtains by transmission of two connecting rods of each counterweight of 2375 kilograms, 6 horse power, and on 16 counterweights, 96 horse power, at the speed of 5 centimeters per second, that is to say 960 horse power at the speed of fifty centimeters per second.

The 32 pumps of this float alternately sucking and delivering, the resistance is exerted only on one half of these 32 pumps; each pump must therefore be provided with a piston having a sufficient diameter for absorbing 6 horse power at the speed of 5 centimeters per second for delivering water in the pipe line under a pressure of 35 atmospheres, the stroke of the piston is of 0 m. 50.

All the conduits of the pressure pipe line, in order to receive turbines each of 100 H. P., under a pressure from 30 to 35 atmospheres and pressure regulating valves opening at a pressure of 36 atmospheres, must have the same cross section and must be provided with a shut-off cock 3. By closing the couplings or unions, it is possible, when starting the operation, to mount the necessary number of turbines which varies according to the amplitude of the waves in each region, their frequencies, the extent of their movements, etc.

It may be advantageous, in one region, to adjust the contact of the pressure gauges in order that they may automatically actuate the turbines by distributing them from 30 to 35 atmospheres, and in other regions, where the waves are less frequent, between 25 and 35 atmospheres, in order to have the least possible stoppage in the operation. In case of sudden excess of pressure, it can be moderated by partially opening the two-way cocks $n^2$ by causing them to discharge in the up channels.

In the case of devastating waves arising from an earthquake, race of the tide, deep waves, etc. the first phenomenon which occurs is a sudden lowering of the sea level. The float $a$ descends therefore rapidly.

The float is provided with one or more raising cables 9. This cable passes over grooved pulleys 10 and 11 between which is arranged a counterweight 12, supported by a pulley 13 straddling the cable, this counterweight being guided in slides 14. It serves to maintain the cable always under a suitable tension. During the normal movements of the float, raising and lowering under the action of the waves, the counterweight 12 moves back and forth in its slides. In case of danger, it operates as will be explained later on. The cable 9 is attached to a winch drum 15 provided with a worm wheel 16 gearing with a worm 17; the latter is rigid with a pulley 18 driven by an electric motor 19 or by hydraulic pressure.

As shown in the drawings, the winch is double so as to be capable of driving two cables.

During the normal movements of the float, the cable 9 moves up and down; the counterweight 12 follows these movements by suitably stretching the cable 9.

When the float lowers below normal levels and reaches a fixed limit, an abutment 20 (Fig. 1) secured on the raising cables 9, causes a lever 21 to pivot, this lever closing three circuits:

The first circuit actuates the switch 31 for closing the circuit of the motor 19. For that purpose, to the lever 21 is attached a cable 22, passing over pulleys 23, 24, 25 and carrying a counterweight 26. This cable is connected to a lever 27 carrying a movable pivoted paddle 28, capable of retaining an abutment 29 rigid with the vertical rod 30 of the switch 31, but able to pass underneath this abutment when the lever 27 moves down.

When the lever 27 is engaged by the abutment 20 which moves down, the cable 22 causes the lever 27 to pivot by lowering its left-hand end. The rod 30 moves down and the plate 31 connects the contacts 32, thus closing the circuit 33 of the motor 19. The latter actuates, through the pulley 18 and the worm 17, the winches 15 which raise the float.

This movement stops when the abutment 20 comes in egagement with the lever 34, raising a yoke 35, lifting the rod 30 of the switch 31, and thus opening the circuit of the motor 19.

The second circuit is closed by the switch 36, which is actuated at the same time as the switch 31 by a lever 37, to which is attached a cable 38 connected to the cable 22. This switch closes the circuit 39 of the motors 40, one of which only has been shown. These motors are adapted to operate the eddy-dams; there are as many motors 40 as there are faces exposed to the action of the sea, each motor actuating a winch 21 carrying on a shaft as many drums as there are cables supporting the dams 60. The said drums allow the panels or eddy-dams 60 to move down. The panels or eddy-dams 60 are guided in a vertical direction by channel members and comprise a plurality of inclined vanes which are rigidly fastened to the frames of the panels or dams. The inclination of these vanes may be any angle which is found to be appropriate for breaking the waves and transforming them into eddy currents so that the waves are higher and have greater speed. The movement stops when an abutment 41, rigid with the cables, comes in engagement with a lever 42. The latter is connected by a cable 43 to a yoke 44 of the switch 36.

A reversing switch 45 allows alteration at will of the direction of rotation of the motors.

The third circuit is the circuit 46 controlled by a switch 47. The rod or stem of this switch is hung from a cable 48 connected to the lever 37. The counterweight 49 has a special shape: it is terminated at both ends by conical surfaces. It results therefrom that in its upward movement it can cause a bar 50, rigid with the stem 51 of the switch 47, to rotate. The stem 51 carries a roller 52 resting on a rotary lever 53. When the said counterweight 49 rises and causes the stem 51 to rotate, the roller no longer supports the same and the stem loaded by a weight 54 falls, thus closing the switch 47. The latter closes the circuit 46 which is the circuit of the alarm bell.

This alarm bell can be stopped only by the attendant in order that he may ascertain the condition of the sea so as to let him know what height he must give to the eddy-dams before lowering the float on the water, operations which are effected at will by lifting the counterweight of each switch, after having, of course, changed the direction of rotation of the motors by means of the reversing switch. In case of wrong operation, of error or of neglect to stop at the required point during the operation of the winches, either for the float, or for the dams, these motors are automatically stopped at the extreme points by the abutments provided on the levers, without other inconvenience than that of beginning the operation over again.

In case of excess of speed taken by the float when the sea is rough, a speed indicator 56, actuated in both directions of rotation by a speed-increasing gearing extending from a shaft provided with links, also acts for actuating the bell and lowering the eddy-dams. This ball indicator is provided with an abutment 58, the end of which forms an incline, so that, when rising, it comes in engagement with the lever 53, and causes it to rotate in any direction; the roller 52 moves away and the stem or rod 51 falls, thus closing again the contacts of the bell. The weight of this rod 51 with that of the weight 54 combined with the counterweight 49, release the abutment closing the contact of the motor 40, lowering the dams until the abutment 41 comes in contact with the lever 59. In this case again, the bell can be stopped only by the attendant, in order that he may ascertain if he must leave these dams lowered, or if he must slightly raise them.

The release of the contact of the bell is effected by raising by hand the rod 51, thus causing the roller 52 to rest again on its lever 53.

It is to be understood that the number of floats is variable, as well as that of the pumps, turbines, motors, winches, etc.

Moreover, all the details of construction may be varied according to the applications. Finally, the forms, dimensions and materials used can be modified, without departing thereby from the scope of the invention.

Having now particularly described my invention what I claim is:—

1. A device for transforming the energy of sea waves comprising a float adapted to be raised by said waves, a hoisting means for said float and automatic means operating said hoisting means upon excessive displacement of said float.

2. A device for transforming the energy of sea waves comprising a float adapted to be raised by said waves, eddy dams surrounding said float, inclined vanes stationarily mounted in said eddy dams and actuating means for vertically moving said eddy dams.

3. A device for transforming the energy of sea waves comprising a float adapted to be raised by said waves, eddy dams surrounding said float, inclined stationary vanes in said eddy dams, actuating means for vertically moving said dams and automatic means operating said actuating means upon lowering of the sea level below the lowest level.

4. A device for transforming the energy of sea waves comprising a float adapted to be raised by said waves, eddy dams surrounding said float, inclined stationary vanes in said eddy dams, actuating means for vertically moving said dams, automatic means operating said actuating means upon lowering of the sea level below the lowest normal level and stop means preventing descent of said dams beyond a definite level.

5. A device for transforming the energy of sea waves comprising a float adapted to be raised by said waves, a means for raising said float and automatic means actuating said means for raising said float upon abnormal lowering thereof.

6. A device for transforming the energy of sea waves comprising a float adapted to be raised by said waves, a means for raising said float, cables between said means and said float, counterweight means maintaining said cables constantly under tension and automatic means operating said means for raising said float upon excessive displacement of said float.

7. A device for transforming the energy of sea waves comprising a float adapted to be raised by said waves, motors and winches for raising said float, cables between said float and said winches, an abutment on one of said cables, and switch means closing the circuit of said motors and actuated by said abutment.

8. A device for transforming the energy of sea waves comprising a float adapted to be raised by said waves, eddy dams surrounding said float, motors and winches for vertically moving said dams, cables between said dams and said winches, an abutment on one of said cables, and switch means means closing the circuit of said motors and actuated by said abutment.

The foregoing specification of my "system for recovering the energy of the movements of the sea" signed by me this 20th day of June 1929.

JULES JOUY.